(12) United States Patent
Loacker et al.

(10) Patent No.: US 8,027,887 B2
(45) Date of Patent: Sep. 27, 2011

(54) DATA PROCESSING METHOD

(75) Inventors: Hansbeat Loacker, Egg (CH); Markus Wietlisbach, Zollikerberg (CH)

(73) Assignee: UBS AG, Zurich (CH)

( * ) Notice: Subject to any disclaimer, the term of this patent is extended or adjusted under 35 U.S.C. 154(b) by 1761 days.

(21) Appl. No.: 11/182,954

(22) Filed: Jul. 18, 2005

(65) Prior Publication Data

US 2006/0248136 A1 Nov. 2, 2006

(30) Foreign Application Priority Data

May 2, 2005 (EP) .................................. 05009595

(51) Int. Cl.
G07B 17/00 (2006.01)
G07F 19/00 (2006.01)
(52) U.S. Cl. .......................................................... 705/30
(58) Field of Classification Search .................... None
See application file for complete search history.

(56) References Cited

U.S. PATENT DOCUMENTS

| | | | |
|---|---|---|---|
| 7,117,172 B1 * | 10/2006 | Black | 705/35 |
| 7,617,156 B1 * | 11/2009 | Wolfson | 705/42 |
| 2003/0158798 A1 | 8/2003 | Green | 705/30 |

FOREIGN PATENT DOCUMENTS

| | | |
|---|---|---|
| EP | 1 431 900 A1 | 6/2004 |
| WO | WO 03/021501 A2 | 3/2003 |

OTHER PUBLICATIONS

Article entitled "Interval Assignment for Periodic Transactions in Real-Time Database Systems" by H. Nakazato et al. of Department of Computer Science, University of Illinois at Urbana-Champaign Urbana, IL 61801, U.S.A., pp. 378-385, CH2968-6/0000/0378$01.00 copyright 1991 IEEE.

Article entitled "Earliest Deadline Scheduling for Real-Time Database Systems" by Jayant R. Haritsa et al. of Computer Sciences Department, University of Wisconsin, Madison, WI 53706, pp. 232-242, 0-8186-2450-7/91$1.00 copyright 1991 IEEE.

* cited by examiner

Primary Examiner — Ryan Zeender
Assistant Examiner — Paul Danneman

(57) ABSTRACT

In one example, a data processing method is provided for the time-optimized calculation of a large number of result data sets at the end of a period. The calculation can be based on data. A time span can be determined for which the underlying data are to be taken into consideration. For each result data set, the probability that the data underlying the calculation of the respective result data set are changed between the calculation of the result data set and the end of the period can be detected. Result data sets within the time span can be calculated. Those result data sets of which the data underlying the calculation have a minor probability of being changed can be calculated prior to those result data sets of which the data underlying the calculation have a higher probability of being changed. The data sets can be stored.

10 Claims, 1 Drawing Sheet

DATA PROCESSING METHOD

BACKGROUND

1. Field of the Invention

The invention relates to a data processing method for a time-optimized calculation of a large number of result data sets at the end of a period.

2. Description of the Prior Art

From prior art it is known that, at particular times of the day, large amounts of data have to be processed regularly on mainframe computer systems of large enterprises. Such data accruing regularly in large amounts will occur, for instance, when, in the course of a business day, the data of transactions that have taken place have been collected. At the end of a business day, these data are processed in a so-called end of day processing.

The information accruing during the individual business processes is collected in the fields of data sets that are stored in files.

The processing of such a file may, for instance, be the performance of the booking processes necessary for the business process, or the administration of a data stock, which have to be processed by a further system. Processing usually does not or not exclusively take place on the computers on which the data are collected and the files are created. Instead, the files are transferred to a central computer for processing, where the files that have been created in many similar systems are collected and processed centrally. In these central systems, the corresponding accounts of the parties participating in a business process are also kept, so that all the data pertaining to the business processes are merged at one central point in the central system.

It is often necessary to process the data sets collected in the course of a business day within a predetermined time slot so as to ensure that, for instance, particular booking processes are terminated on the same business day. Therefore, the files are transferred to and processed in the central computer at such an early time that a processing of the data on the same day is guaranteed. The result of this is that the data are transferred to the central system not before the end of a day and that the central system has to process the data by the end of the day. The processing comprises, for instance, the recording of business processes as a booking process into an account, or the recording of a transaction into an account, so that one or several transactions have to be recorded for one account.

It is further known that, at the end of particular periods, for instance at the end of a month, a quarter, or a year, particular final processings have to be performed on such mainframe computer systems to establish e.g. financial statements for the period of time that is just ending. For regular current accounts, for instance, a monthly financial statement has to be established at the end of a month, quarterly financial statements have to be established at the end of a quarter, and, at the end of a year, the respective annual financial statement additionally has to be established e.g. for the savings accounts, where, for instance, the interests for the ending year are calculated and booked into the account. To this end, software modules available on the mainframe computer system are started. These software modules calculate, for instance, first of all the medium balance of a savings account for the ending period so as to determine, as a function thereof, the fees that are due. By means of the interest numbers, the interests for the given period are calculated. Likewise, a further software module determines, for instance, the account management charges for the same period. The values determined such are then booked as transactions into the respective account. These transactions are thus not supplied to the mainframe computer system from outside as a business process in the scope of the daily business, but are generated on the mainframe computer itself by software modules running there. The booking of these transactions that are generated by the mainframe computer system itself is, however, identical to the booking of the transactions supplied to the system from outside and is performed by the same software modules.

At the end of such a period, the amount of data accruing daily thus has to be processed, on the one hand, which is performed in a so-called end of day processing, and, on the other hand, the financial statements of accounts and the like required at the end of the respective periods have to be established, which are referred to as end of month, or end of quarter, or end of year processing.

With respect to the end of day processing and the end of month, end of quarter, or end of year processing, it has to be noted that they cannot be performed independently of each other. All the results, i.e. bookings and transactions, that took place on the last day of the respective period will not only have to be taken into consideration on this very day in the end of day processing, but also for the final processing for the period that is just ending since the business processes are not just part of to this very day, but also of the period. Consequently, the end of month, end of quarter, or end of year processing can only take place when the end of day processing of the respectively preceding days has been terminated.

If the end of month, end of quarter, or end of year processing starts before the end of day processing has been terminated, there will be the risk that, for instance, a business process for an account is booked only after the calculation of the end of month, end of quarter, or end of year processing for this account and is thus not taken into consideration there. The results of the end of month, end of quarter, or end of year processing would thus be incorrect.

To ensure that all the business processes of one day are not only taken into consideration in the end of day processing, but also in the end of month, end of quarter, or end of year processing, it would be possible to start the end of month, end of quarter, or end of year processing only when the end of day processing has been terminated.

This might result in that the end of month, end of quarter, or end of year processing is started only shortly before the end of the last day of the ending period and thus can, due to the large amount of data, not be terminated prior to the end of the day and thus not in time. However, there exists the necessity that a monthly, quarterly or annual financial statement e.g. of an account has to be terminated by the end of the respective period.

SUMMARY OF THE INVENTION

It is an object of the invention to provide a method that enables the timely establishing of the financial statements required at the end of such a period by taking into consideration all the business processes of the period.

With a data processing method for the time-optimized calculation of a large number of result data sets at the end of a period, wherein the calculation is based on data that can be changed prior to the end of the period, the object is solved in that the data processing method comprises at least the following steps:

(1) determining a time span for which the underlying data are to be taken into consideration,
(2) detecting, for each result data set, the probability that the data underlying the calculation of the respective result data set are changed between the calculation of the result data set and the end of the period, (3) calculating the result data sets within the time span, wherein those result data sets of which the data underlying the calculation have a minor probability of being changed are calculated prior to those result data sets of which the data underlying the calculation have a higher probability of being changed, (4) storing the result data sets, (5) detecting, for each result data set, shortly prior to the end of the period whether the data underlying the calculation of the result data set were changed after the calculation of the result data set, and possibly calculating a correction, in particular performing a recalculation, for the respective result data set.

At the beginning of the procedure, the time span required for performing the subsequent method steps may be determined. On the one hand, it serves to determine the starting point for the calculation of the result data sets. On the other hand, it predetermines the maximum time to be taken into consideration in the next method step. The time span determined is, according to experience, short vis-à-vis the ending period and ends at the same time therewith. Typically, such a time span has the length of some days and is assessed by means of experience values.

In the second method step, there is determined a probability for the fact that the data on which the calculation of a result data set has to be based will undergo a change within the time between the calculation of a result data set and the end of the period. Thus, it is determined for each result data set whether the data that have to be taken into consideration during the calculation will change after the calculation of the result data set with high or with low probability. The probability is to a high extent dependent on the type of the underlying data itself and will, in practice, frequently have to be assessed by means of experience values.

In the third step, the result data sets are calculated by processing of the data. The processing starts with the beginning of the time span and ends shortly before the end of the time span. At the time of calculation of the result data set, all the data available for this result data set are taken into consideration. The result data set thus remains correct as long as the data underlying the calculation remain unchanged. The probability of a change of the data after the time of processing as determined in the first method step thus also indicates the probability with which the result data set remains correct until the end of the period. Only when the data underlying the calculation of the result data set are changed, i.e. when, in particular, new data that have to be taken into consideration are added after the calculation of the result data set, will the result data set become incorrect.

During the calculation of the result data sets, those will be calculated first that will with high probability remain correct until the end of the period has been achieved, i.e. for the underlying data of which a low probability of a change was determined. Result data sets for the calculation of which data have to be taken as a basis for which a high probability of a change was determined after the time of calculation of the result data set will be calculated correspondingly later, i.e. with a minor interval to the end of the period, so that these result data sets will, with high probability, not have to be corrected, either.

In the fourth method step, the result data sets that have been determined this way prior to the end of the period are stored.

The fifth method step is performed as close as possible to the end of the period. In this method step it is examined whether the data underlying the calculation of a result data set have been changed since the calculation of the result data set. Such a change may be a change of individual data that have already been taken into consideration during the calculation of a result data set, or new data may have been added. If such a change of the underlying data is determined, the originally calculated result data set is no longer correct and a correction is performed, in particular a recalculation is performed by which the change of the data is taken into consideration.

The data processing method according to the invention thus enables the rectification of the calculation of the large number of result data sets occurring at the end of a period, and it will be ensured at the same time that the result data sets will, at the end of the period, be based on the data that are up to date then.

There are a plurality of possibilities of designing and further developing the method according to the invention in an advantageous manner. In the following, several preferred embodiments will be described by means of an application from the bank sector. The drawing shows:

DETAILED DESCRIPTION

Figure 1:
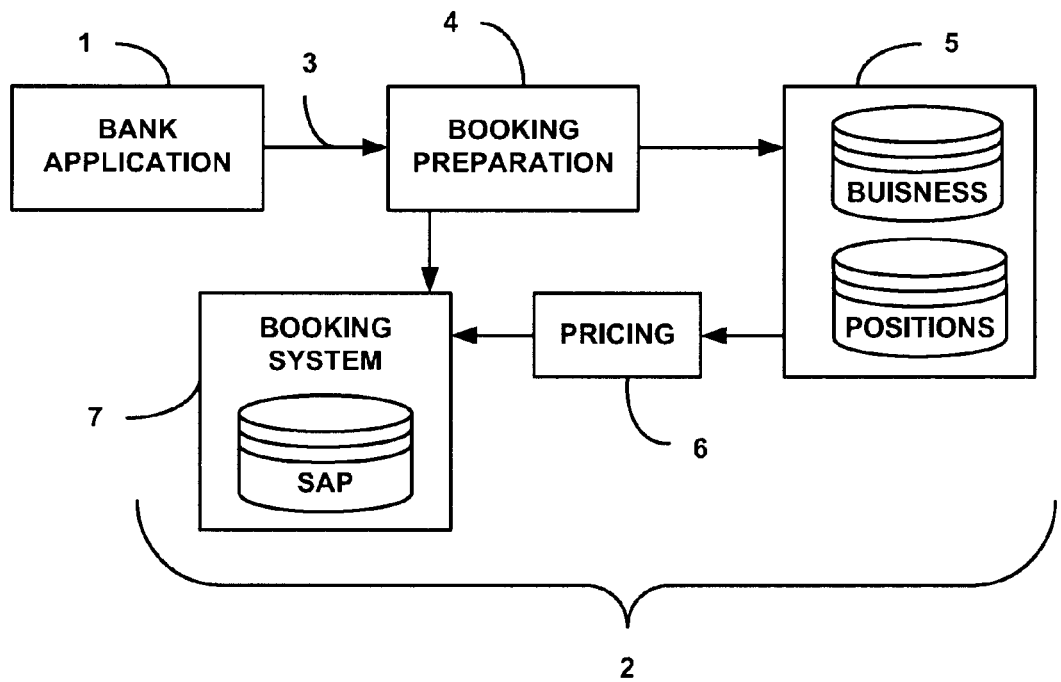
FIG. 1 a section from a bank application
FIG. 2 a simplified time diagram for calculating the result data sets

FIG. 1 shows a schematically illustrated section of a bank's data processing. This data processing consists of the processing of the data that the bank applications 1 supply to a central computer 2 every day, with the data flow being symbolized by the arrow 3. These data are information about the business processes performed on this business day and may be information about counter business, stock market transactions, payment transactions, transactions performed at a cash dispenser, or telebanking transactions performed by PC. All this information is first of all collected on the central computer 2 and processed by a so-called booking preparation 4. Subsequently, the data are further processed by further software modules; the data are, for instance, prepared in a not illustrated, so-called accounting feeder process for the further processing by the subsequent processes. In the further processing, the information re the individual transactions performed is, for instance, entered in the tables "businesses/transactions" 5. This is followed by the so-called "pricing" 6 that calculates the bank charges accruing for the individual transactions and provides them as a further transaction for booking into the account. The statement per the end of a period on an account can only be performed when all the bookings occurring in this period, including the pricing bookings, have been booked into the account. The pricing bookings for the corresponding period may in turn again depend on the "normal" bookings occurring during the period.

The processing of the data that are supplied to the central system 2 every day may only be performed in the evening when the business processes or transactions, respectively, have been performed and the corresponding data have been transmitted to the central computer system 2 on which the accounts are centrally administered. For the processing of these data there exists the instruction that they have to be booked on the same day or have to be entered in the appropriate databases "businesses", "positions", respectively. On the one hand, the respective bookings will thus take place on the same day, so that all balances are up to date on the following day, on the other hand, the collection of larger amounts of data is avoided, which would lead to a data congestion in a chain. Since, due to the existing dependencies between the individual processing steps, a predetermined order has to be kept during the processing and only a limited time slot can be utilized, the entire processing of the data of a business day is time-critical.

The processing of the data is performed in so-called jobs. In a concrete example of a big bank, approx. one million of these jobs are thus processed.

In addition to the data to be processed every day, further data processing accrues at the end of particular periods. Thus, at the end of a month, a quarter, or a year, for instance, statements for the accounts or savings books, which will be summarized in the following by the term account, have to be calculated. It is stipulated by law that all customer accounts have to be settled at the end of the year.

The calculation of these statements for the accounts partially takes place with the software modules that are used during the processing of the data that are transferred to the mainframe computer system 2 from the bank applications 1 every day. Thus, the bank charges due for the account management at the end of a period are, for instance, calculated by the pricing software module 6.

These statements, on the one hand, require that the calculation has to be terminated by the end of a period. On the other hand, all the transactions performed for this account by the end of the period have to be taken into consideration when calculating the respective statement. Consequently, the calculation of such an account statement has to be performed as close as possible to the actual end of the period. With such a calculation of a statement there are, as with the processing of the daily accruing transaction data, dependencies between the steps of such a calculation that have to be performed. Thus, the amount of the interests to be booked for a balance and the bank charges have to be calculated, for instance, before they are booked as a transaction for the account, and before the total balance is subsequently calculated at the end of the respective period.

At the end of such a period, in addition to the transaction data that have to be calculated every day, the calculations of the account statements thus have to be performed, which will be referred to as result data sets in the following.

In the case of an exemplary big bank, approx. 10 million of so-called jobs accrue at the end of a year by the statements to be calculated, so that the load generated by the calculation of the result data sets reaches the ten-fold load of an end of day processing.

For processing this load within one day, considerably more calculating performance would thus have to be reserved, which would be used to capacity at the end of a period only, but would remain unused for the far largest part of the time. This would not be economical. In practice, the problem is, however, also aggravated by the fact that the calculations to be performed for the statements as well as the processing of the daily data relate to the same accounts and partially have to be performed by the software modules that are also used in the scope of an end of day processing. Consequently, the calculation of the statements cannot be considered isolated from the processing of the daily data.

A straightening out of this time problem is possible with the method steps of the data processing method as suggested.

In the first method step, the time span that is required for the result data sets to be calculated in the scope of the ending period will be determined. This time span ends with the end of the ending period since the account statements, i.e. all the result data sets, have to be calculated correctly at that point in time. Since the calculation of the account statements has to be performed within the period, the point in time within the period at which the calculation of the account statements has to be started can be determined by the length of the time span. In practice, this time span can be determined as a product from the number of account statements to be calculated and the time required for each calculation, with the time required for the calculation of an account statement being an experience value or an estimated value.

The determination of the probability of a change of the data underlying the calculations in the second method steps is based on that, according to experience, few transactions take place on a large share of the accounts, whereas daily transactions have to be booked into a small share of the accounts only. Thus, on savings accounts from which no direct transfers to other accounts or no stock market transactions are possible, for instance, and on which there is a comparatively small balance, there will be very few transactions. With an increasing balance, however, the number of transactions will, according to experience, increase. Furthermore, with accounts that are kept as so-called current accounts, but are not used for the so-called payment transactions, a somewhat higher number of transactions will have to be expected. In this case, there may also be differentiated whether or not a credit card was issued for an account. If no credit card was issued for an account, rather fewer transactions will have to be expected. Most of the account movements that have to be booked at the end of a period will, according to experience, be for accounts from which wage payments are effected since these are frequently paid at the end of a month.

Thus, there are a number of types of accounts that are not used for performing daily payments and on which there are, consequently, few movements. Furthermore, there are accounts that could indeed be used for a plurality of transactions, but on which few transactions actually take place since the account holders do not make use of the possibilities available. Finally, there are accounts on which, according to experience, transactions are to be booked regularly even at the end of a month and thus at the end of a period.

For some types of accounts and for some groups of account holders the probability of a change shortly prior to the end of a period is thus very small, whereas for other accounts transactions will also have to be booked on the last day of the period with very high probability.

For determining the probability that transactions have to be booked for an account after the calculation of the statement and that thus the data on which the calculation of the result data set have to be based will change after the point in time of the calculation, the criteria that have been mentioned by way of example may, on the one hand, be referred to. On the other hand, the statistics of the transaction in the past may also be referred to for an account and may be evaluated exactly mathematically, so that the probability can be determined irrespective of the type of the account or of a credit card issued for the account.

Figure 2:
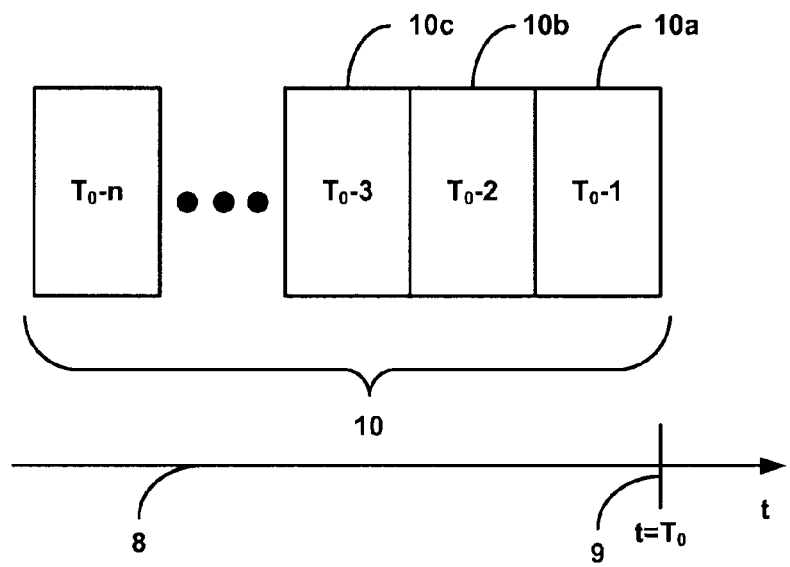

The time flow of the method will be explained in the following by means of FIG. 2.

Let the end of a period be the point in time 9 $t=T_0$ on the time beam 8. Since the calculation of the result data sets, i.e. of the account statements, has to be performed with some interval prior to the actual end 9 of the period, i.e. $t=T_0$, the time span 10 required for the calculation of all statements, i.e. all result data sets, the end of which coincides with the end of the period 9, is calculated in advance. Let the length of the time span here be n days. In practice, the time span will be an estimated value which includes the quantity of the available data stock, the statistics about the duration of such end of month, end of quarter, or end of year processings in the past, and a safety factor. The calculation of the result data sets thus starts at the latest at the beginning of the time span, i.e. on the day $t=T_0-n$.

Subsequently, for all accounts for which such result data sets have to be calculated, the respective probability is calculated for the fact that the data underlying the calculation of the result data sets will change in the time span between the respective calculation of a result data set and the actual end of the period. Such changes may be any kind of business processes that were carried out for an account. It has to be taken into consideration that the time spans between the respective calculation of a statement or a result data set, respectively, and the end of the period are different since the result data sets are not calculated simultaneously, but successively. The determined time span 10 in which all result data sets can be calculated may thus be subdivided into smaller segments 10a, 10b, etc., for which the probability of a change of the data on which the calculation is to be based has to be determined.

The results calculated prior to the end of the period will remain correct as long as the data underlying the calculation remain unchanged. Thus, the determined probability of a change of the data underlying the calculation of a statement will also be the probability with which the statement calculated is no longer correct at the end of the period 9.

In the third method step, the result data sets are calculated. Advantageously, those result data sets to be calculated are comprised to form a group for which the same or almost the same probability of change has been determined, so that such a group of result data sets can be calculated in one segment and thus in one program run, a so-called batch run. The calculation of the result data sets starts at the beginning of the respective segment 10a, 10b, . . . of the time span 10. In practice, for reasons of practicability, as many groups of result data sets are formed as the time span may usefully be subdivided into segments, wherein every segment may, for instance, be one day. On each day 10a, 10b, 10c . . . within the time span 10 a group of result data sets is thus calculated. In so doing, first of all those result data sets are calculated for the underlying data of which the smallest probability of change has been determined and that will, consequently, be correct with the utmost probability even at the end of the period 9. Those result data sets for the underlying data of which a high probability of change has been determined will correspondingly be calculated at the end of the time span, and thus with a small interval from the end of the period. This order during the calculation of the result data sets ensures that a lowermost number of result data sets will no longer correct due to changes of the underlying data after their calculation and prior to the end of the period.

During the calculation of the result data sets it must further be ensured that the calculation basis is not changed during this time. All the bank-internal variables to be taken into consideration during the calculation, such as those for the calculation of bank charges, the so-called pricing, thus must no longer be changed after the calculation of the statement. It must also be guaranteed that a transaction is not booked exactly at that point in time at which the result data set, i.e. the statement, is calculated for an account. An overlapping of the two calculations might result in that a transaction for an account is booked in the scope of the daily processing of transaction data, but that it is not included in the calculation of the result data set, i.e. of the statement.

In the next method step, the result data sets calculated this way are stored in the final provisions provided therefor. This means that the result data sets are booked into the accounts prior to the end of the period. In order to take into consideration that the calculation of the statement has been anticipated in time, a differentiation is made between the booking date and the value date, so that, for instance, the interests falling due for a savings account are calculated by the end of the period and are already booked, but the valuing takes place at the end of the period only.

In the last method step it will be determined whether the data underlying the calculation of the result data sets have actually been changed after the calculation of the respective result data set. This method step is typically performed shortly before the end of the period and ideally when all the transactions of the last day prior to the end of the period have been booked, so that a further change of the data is excluded.

The determination of whether the data underlying the calculation of a result data set have been changed after the point in time of the calculation always has to be performed for every result data set. The method may advantageously be designed such that all the transactions that are booked for an account after the point in time of the anticipated calculation of the result data set are, in addition to the booking into the account, written into a table. On the last day of the ending period and after all the transactions of this day have been booked for the respective accounts, the table thus will contain all the transactions that have changed the data underlying the calculations. One possibility of putting this into practice is, for instance, to correspondingly change the software modules that book the transactions for the respective account, so that they write the data necessary for a correction of the statement that has already been calculated into the table. Alternatively, this functionality could also be performed by a so-called database trigger that can be configured such that it is adapted to itself perform particular actions in a database table in the case of particular actions. In the last method step it would then, by means of this table, be easier to determine for which account statements a correction has to be carried out, i.e. which result data sets would have to be recalculated or to be corrected, respectively. In the example of a big bank, the actual examination is performed in accordance with a third variant. After all the result data sets have been calculated and all the transactions of this day have been processed on the last day of the ending period, i.e. the end of day processing has been terminated, a software module is started which performs the examination and triggers a recalculation of a result data set if the examination reveals a change of the data underlying the calculation of the result data set. The software module examines for each account, by means of a table in which all transactions are stored, whether transactions have been booked for the respective account after the respectively pertinent first result data set has been calculated. The table contains at least all the transactions of the ending period, i.e. it is not only kept during the time span of the calculation of the result data sets.

If it is determined for a result data set that it is no longer correct due to a change of the data underlying the calculation, a correction in which the changes of the data are taken into consideration will be calculated. Such correction of a result data set may advantageously be performed such that, first of all, the result data set that is no longer valid is cancelled, i.e. is marked invalid. Subsequently, a new result data set is calculated on the basis of all the data of the period. This has the advantage that the result data set that has been cancelled and marked invalid need not be transferred to the account holder since the recalculated result data set is logical per se and thus comprehensible without the preceding result data set.

In the example of a big bank it is actually only the result data set that has been calculated later and that is thus correct that is visible for the account holder in the case of such correction of a result data set. The cancelled result data set is not deleted from the account, it is, however, marked invalid and thus obtains a marking with the meaning that this result data set must not be indicated to the account holder. Applications via which the account holder may see the bookings into his account, for instance a software module operating an account statement printer, or an internet server via which the account holder accesses its account by telebanking, may recognize from this marking that the result data set is not to be indicated.

The data processing method as suggested thus enables the anticipation in time of the calculation of the result data sets while it is ensured that all transactions that will still take place until the end of the period have been taken into consideration. By the determination of the probability of a change of the data underlying the calculations it is possible to optimize the order of the calculations, so that as few result data sets as possible have to be corrected. At the same time, it is achieved that the result data sets are calculated close to the actual end of a period, thus minimizing the resulting calculating load for the computer system and avoiding an uneconomical reservation of computing performance.

The invention claimed is:

1. A data processing method implemented in at least one computer for the time-optimized calculation of a large number of result data sets at the end of a period, wherein the calculation is based on data that can be changed prior to the end of the period, wherein the at least one computer comprises a memory for storing computer executable instructions and a processing core for accessing the memory and executing the computer executable instructions, and wherein the data processing method comprises at least the following steps:
   (1) determining, by the at least one computer, a time span for which the underlying data are to be taken into consideration,
   (2) detecting, by the at least one computer, for each result data set, the probability that the data underlying the calculation of the respective result data set are changed between the calculation of the result data set and the end of the period,
   (3) calculating, by the at least one computer, the result data sets within the time span, wherein those result data sets of which the data underlying the calculation have a minor probability of being changed till the end of the period are calculated prior to those result data sets of which the data underlying the calculation have a higher probability of being changed till the end of the period to minimize the total calculating load for the at least one computer,
   (4) storing, by the at least one computer, the result data sets,
   (5) detecting, by the at least one computer, for each result data set, shortly prior to the end of the period whether the data underlying the calculation of the result data set were changed after the calculation of the result data set, and possibly calculating a correction, in particular performing a recalculation, for the respective result data set.

2. The data processing method according to claim 1, wherein the data underlying the calculation are comprised in groups, wherein for a group of data the substantially equal probability of a change was determined in advance, in particular in advance for several time spans.

3. The data processing method according to claim 1, characterized in that the probability of a change of the data underlying the calculation of a result data set is determined on the basis of statistical values.

4. The data processing method according to claim 1, wherein the correction, in particular the recalculation of a result data set, is not visible on the outside.

5. The data processing method according to claim 1, characterized in that the result data sets are statement or closing bookings and/or charge bookings at the end of a period.

6. The data processing method according to claim 1, characterized in that those data underlying the calculation of a result data set are marked that have been changed after the calculation of the respective result data sets.

7. The data processing method according to claim 1, characterized in that, after the calculation of a result data set, newly added data that have to be taken into consideration for the correction, in particular the recalculation of the result data set, are marked.

8. The data processing method according to claim 1, characterized in that the data processings are calculations and bookings of a bank.

9. The data processing method according to claim 1, characterized in that, during the calculation, the result data sets are marked with the time stamp of the calculation.

10. A non-transitory computer readable medium having computer executable instructions for performing a data processing method implemented in at least one computer for the time-optimized calculation of a large number of result data sets at the end of a period, wherein the calculation is based on data that can be changed prior to the end of the period, wherein the data processing method comprises:
   (1) determining, by the at least one computer, a time span for which the underlying data are to be taken into consideration,
   (2) detecting, by the at least one computer, for each result data set, the probability that the data underlying the calculation of the respective result data set are changed between the calculation of the result data set and the end of the period,
   (3) calculating, by the at least one computer, the result data sets within the time span, wherein those result data sets of which the data underlying the calculation have a minor probability of being changed till the end of the period are calculated prior to those result data sets of which the data underlying the calculation have a higher probability of being changed till the end of the period to minimize the total calculating load for the computer,
   (4) storing, by the at least one computer, the result data sets,
   (5) detecting, by the at least one computer, for each result data set, shortly prior to the end of the period whether the data underlying the calculation of the result data set were changed after the calculation of the result data set, and possibly calculating a correction, in particular performing a recalculation, for the respective result data set.

* * * * *